(12) United States Patent
Imani Hossein Abad et al.

(10) Patent No.: US 11,861,003 B1
(45) Date of Patent: Jan. 2, 2024

(54) FRAUDULENT USER IDENTIFIER DETECTION USING MACHINE LEARNING MODELS

(71) Applicant: INTUIT INC., Mountain View, CA (US)

(72) Inventors: Navid Imani Hossein Abad, Mountain View, CA (US); Tin Nguyen, Mountain View, CA (US)

(73) Assignee: INTUIT INC., Mountain View, CA (US)

( * ) Notice: Subject to any disclaimer, the term of this patent is extended or adjusted under 35 U.S.C. 154(b) by 0 days.

(21) Appl. No.: 18/194,028

(22) Filed: Mar. 31, 2023

(51) Int. Cl.
*G06F 21/55* (2013.01)
*G06N 20/00* (2019.01)

(52) U.S. Cl.
CPC .......... *G06F 21/554* (2013.01); *G06N 20/00* (2019.01); *G06F 2221/033* (2013.01)

(58) Field of Classification Search
None
See application file for complete search history.

(56) References Cited

U.S. PATENT DOCUMENTS

| | | | | |
|---|---|---|---|---|
| 11,599,667 | B1 * | 3/2023 | Tutuianu | G06F 21/6245 |
| 2010/0076922 | A1 * | 3/2010 | Hariharan | G06N 20/00 |
| | | | | 709/206 |
| 2018/0302430 | A1 * | 10/2018 | Israel | G06Q 50/01 |
| 2021/0117552 | A1 * | 4/2021 | Vlissidis | G06F 40/284 |
| 2021/0142329 | A1 * | 5/2021 | Aparício | G06N 5/025 |
| 2021/0201154 | A1 * | 7/2021 | Rozental | G06F 16/9032 |
| 2021/0295179 | A1 * | 9/2021 | Eyal Altman | G06N 5/04 |
| 2021/0334811 | A1 * | 10/2021 | Gu | G06Q 40/12 |
| 2022/0294751 | A1 * | 9/2022 | Slobodyanuk | H04L 51/212 |
| 2022/0400094 | A1 * | 12/2022 | Sampath | H04L 51/214 |
| 2022/0405580 | A1 * | 12/2022 | Zheng | G06F 18/24147 |

FOREIGN PATENT DOCUMENTS

CN 108877929 A * 11/2018

* cited by examiner

*Primary Examiner* — Christopher C Harris
(74) *Attorney, Agent, or Firm* — Patterson + Sheridan, LLP (57) ABSTRACT

Certain aspects of the present disclosure provide techniques for identifying fraudulent user identifiers in a software application. An example method generally includes generating a vector representation of a user identifier. Using a first machine learning model and the vector representation of the user identifier, a fingerprint representative of the user identifier is generated. Using the first machine learning model and the generated fingerprint, a score is generated. The score generally describes a likelihood that the user identifier corresponds to a fraudulent user identifier. One or more similar user identifiers are identified based on the generated fingerprint and a second machine learning model. One or more actions are taken within a computing system relative to a user associated with the user identifier based on the generated score and the identified one or more similar user identifiers.

10 Claims, 6 Drawing Sheets

FRAUDULENT USER IDENTIFIER DETECTION USING MACHINE LEARNING MODELS

INTRODUCTION

Aspects of the present disclosure relate to fraud detection in software applications, and more specifically to identifying fraudulent user identifiers in a software application and blocking use of the software application using fraudulent user identifiers.

BACKGROUND

Software applications are generally deployed for use by many users for the performance of a specific function. These applications may be deployed, for example, as web applications accessible over a network, such as the Internet or a private network, or as desktop applications that include static components executed from a local device and dynamic components executed from content retrieved from a network location. These applications can include financial applications, such as tax preparation applications, accounting applications, personal or business financial management applications; social media applications; electronic communications applications; and so on. These software applications generally include help functions that users frequently interact with to obtain information about how to perform various tasks within the software application. Some applications may additionally provide execution environments for the use of third-party plugins, extensions, helpers, and other components to add functionality to these applications. These components may be available for users to download or otherwise link to an instance of a software application through an application store.

These software applications may be subject to various attacks by malicious parties. For example, some software applications may be attacked by users attempting to register fraudulent user identifiers to gain access to these software applications and use these software applications for potentially malicious purposes. In one example, a messaging system used by fraudulent users could be used to generate malicious messages which can be used to obtain personal information (e.g., names, passwords, national identification numbers (e.g., Social Security Numbers in the United States, National Insurance Numbers in the United Kingdom, or the like), etc.) from various persons. In another example, fraudulent users can attempt to obtain access to access-controlled systems, such as multimedia websites, software developer portals, or the like, in order to perform various malicious actions based on access to these access controlled systems.

Because a potentially unlimited number of users can attempt to register for access and use a software application, identifying fraudulent and legitimate users of a software application is a computationally expensive process. For example, manual review of user identifiers may be impossible or at least highly impractical due to the number of extant user identifiers used to register for access to a software application and the rate at which new user identifiers are used to generate new accounts for accessing the software application.

BRIEF SUMMARY

Certain embodiments provide a computer-implemented method for identifying fraudulent user identifiers in a software application. An example method generally includes generating a vector representation of a user identifier. Using a first machine learning model and the vector representation of the user identifier, a fingerprint representative of the user identifier is generated. Using the first machine learning model and the generated fingerprint, a score is generated. The score generally describes a likelihood that the user identifier corresponds to a fraudulent user identifier. One or more similar user identifiers are identified based on the generated fingerprint and a second machine learning model. One or more actions are taken within a computing system relative to a user associated with the user identifier based on the generated score and the identified one or more similar user identifiers.

Certain embodiments provide a computer-implemented method for training a machine learning model to predict activity within a software application. An example method generally includes generating a first training data set including a plurality of user identifier samples. Generally, each respective user identifier sample in the plurality of user identifier samples includes a vector representation of a respective user identifier associated with the respective user identifier sample and an indication of whether the respective user identifier is associated with a legitimate or fraudulent user of a software application. A first machine learning model is trained to generate a fingerprint for an input user identifier and predict whether the input user identifier is associated with a legitimate or fraudulent user of the software application based on the first training data set. A second training data set is generated. Generally, the second training data set includes fingerprints generated by the first machine learning model for the plurality of user identifier samples in the first training data set. A second machine learning model is trained to identify a cluster of similar user identifiers to the input user identifier based on the second training data set. The first machine learning model and the second machine learning model are deployed.

Other embodiments provide processing systems configured to perform the aforementioned methods as well as those described herein; non-transitory, computer-readable media comprising instructions that, when executed by one or more processors of a processing system, cause the processing system to perform the aforementioned methods as well as those described herein; a computer program product embodied on a computer readable storage medium comprising code for performing the aforementioned methods as well as those further described herein; and a processing system comprising means for performing the aforementioned methods as well as those further described herein.

The following description and the related drawings set forth in detail certain illustrative features of one or more embodiments.

BRIEF DESCRIPTION OF THE DRAWINGS

The appended figures depict certain aspects of the one or more embodiments and are therefore not to be considered limiting of the scope of this disclosure.

To facilitate understanding, identical reference numerals have been used, where possible, to designate identical elements that are common to the drawings. It is contemplated that elements and features of one embodiment may be beneficially incorporated in other embodiments without further recitation.

DETAILED DESCRIPTION

Aspects of the present disclosure provide apparatuses, methods, processing systems, and computer-readable mediums for identifying fraudulent user identifiers within a software application using machine learning models trained to classify user identifiers as fraudulent or legitimate and to identify similar user identifiers.

Generally, malicious parties use various techniques to generate fake user identifiers en masse in order to sign up for access to an access-controlled software application. For example, these parties can use these generated fake identifiers to sign up for fake accounts, gain access to developer applications, and the like. After these fraudulent users have signed up for access to an access-controlled software application, these fraudulent users can, in some cases, attempt to use the software application for malicious purposes. Further, operators of these software applications can communicate with users of these software applications using mass mailing techniques (e.g., by placing these users on a mailing list to which various communications are sent). Because sending a communication generally incurs some cost, both monetarily and in terms of used computational resources (e.g., storage space, bandwidth, etc.), operators of software applications having a significant number of accounts associated with fraudulent user identifiers can spend resources on various communications that do not have any value to the operator.

Because fake user identifiers can be generated cheaply and en masse, it may be impractical, if not impossible, to manually analyze and block both extant and newly generated users from accessing an access-controlled software application. Further, these user identifiers may, in some cases, appear to correspond to actual valid email addresses or other identifiers which can be used to sign up for access to an access-controlled system. Thus, conventional machine learning models may not accurately be able to identify which users of a software application are associated with legitimate user identifiers and which users of the software application are associated with fraudulent user identifiers.

Aspects of the present disclosure provide techniques for training and using machine learning models to accurately identify fraudulent user identifiers used to access a software application. As discussed in further detail herein, these machine learning models may include a first machine learning model which classifies user identifiers as legitimate or fraudulent and generates a fingerprint for each user identifier and a second machine learning model which identifies a group of similar user identifiers based on the generated fingerprints. Using both the classification of a user identifier and the generated fingerprint for the user identifier in an improved machine learning process, aspects of the present disclosure may identify users associated with fraudulent user identifiers with a level of accuracy that could not be achieved through the use of conventional machine learning techniques, and can take various actions to block these users from interacting with the software application, receiving communications related to the software application, and the like. Thus, aspects of the present disclosure may allow for an optimized allocation of computing resources (e.g., processing capabilities, memory, network bandwidth, and the like) to the software application that is appropriate for allowing legitimate users of the software application to use the software application while avoiding the over-allocation of computing resources to account for use of a software application by fraudulent users. This may, thus, minimize the amount of resources allocated to the software application and may allow for resources that would otherwise be allocated to the software application (e.g., in response to expected use by fraudulent users) to be made available for use by other software applications (e.g., in a cloud environment in which computing resources are allocated dynamically), which in turn also improves the functioning of computing systems involved.

Example Fraudulent User Identifier Prediction Using Machine Learning Models

Figure 1:
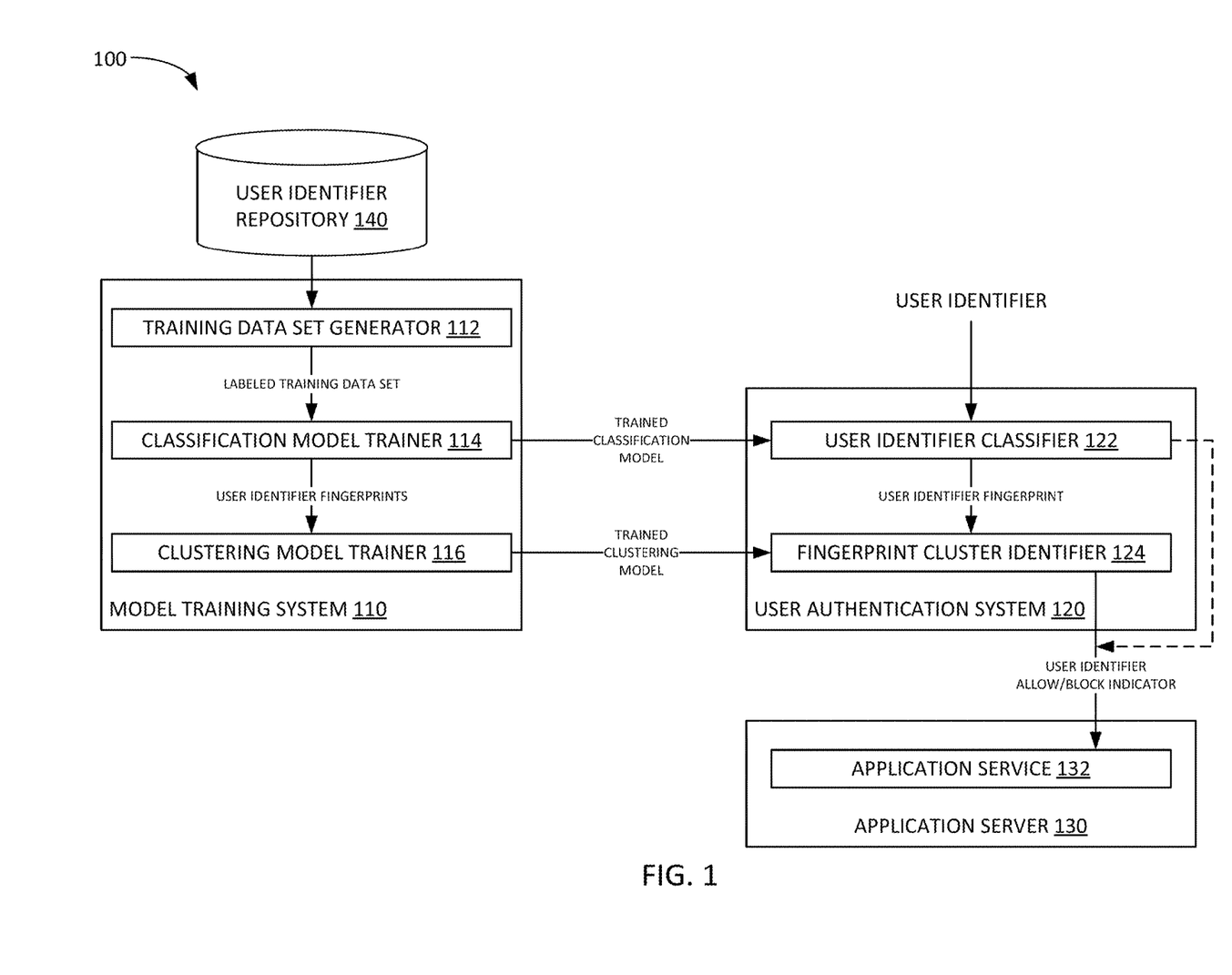
FIG. 1 illustrates an example system in which machine learning models are trained and used to identify potentially fraudulent user identifiers in a software application, in accordance with aspects of the present disclosure.

FIG. 1 illustrates an example environment 100 in which machine learning models are trained and used to identify fraudulent user identifiers used to access a software application and take various actions to manage access to the software application, according to aspects of the present disclosure. As illustrated, environment 100 includes a model training system 110, a user authentication system 120, an application server 130, and a user identifier data repository 140.

Model training system 110 is generally representative of any computing system which can train and deploy a machine learning model to predict whether user identifiers associated with users of a software application are fraudulent or legitimate based on predictive scores and fingerprints associated with these user identifiers. As illustrated, model training system 110 includes a training data set generator 112, classification model trainer 114, and clustering model trainer 116.

Training data set generator 112 generally generates a training data set which can be used to train a classification model to identify an input user identifier as fraudulent or legitimate. Generally, training data set generator 112 can generate the training data set as a labeled training data set including information from user identifier repository 140 about a user identifier, labeled with an indication of whether the user identifier is a legitimate or a fraudulent user identifier. In some aspects, the user identifier information from user identifier repository 140 may include manually generated information identifying user identifiers as fraudulent or legitimate, as well as automatically-generated information identifying new user identifiers as potentially fraudulent or legitimate (e.g., based on a classification generated by the user identifier classifier 122 and/or fingerprint cluster identifier 124 of user authentication system 120).

To generate the training data set, training data set generator 112 generally generates a vector representation of each user identifier to be included in a training data set. A user identifier may be structured as a string, which may be represented as an array of characters. The vector representation may be a two-dimensional vector including a one-hot vector for each character in the array of characters forming the string representation of the user identifier. Generally, a one-hot vector may be a one-dimensional matrix including values for each valid character that may be included in a user identifier. The valid character set for a user identifier may, for example, be based on a global set of valid characters (e.g., including characters in the Latin script, characters in the Cyrillic script, characters in the Greek script, and so on, and may include characters with various diacritics or other modifiers that may be used in various languages) or may be localized to account for a character set used by users of a software application in a specific location. Within the one-dimensional matrix, one entry may be set to a high value (e.g., the value corresponding to the character for which the one-hot vector is generated), such as 1, and the other entries in the one-dimensional matrix may be set to a low value, such as 0.

The resulting vector representation of a user identifier may thus be a two-dimensional matrix having dimensions of the number of characters in a user identifier by the number of valid characters defined for a user identifier in the software application. In an example in which each character of a user identifier is represented by a column in the two-dimensional matrix, the resulting matrix may have one value set to high in each column of the matrix; similarly, in an example in which each character of the user identifier is represented by a row in the two-dimensional matrix, the resulting matrix may have one value set to high in each row of the matrix.

Classification model trainer 114 generally uses the training data set generated by training data set generator 112 in order to train a classification model that, as discussed in further detail below, generates a fingerprint representing a user identifier and a score indicative of whether a user identifier is fraudulent or legitimate. In some aspects, the classification model may be a machine learning model, such as a convolutional neural network, that is trained to generate a fingerprint as an output of an embedding layer of the convolutional neural network and is trained to generate a score based on the generated fingerprint. The convolutional neural network may include a plurality of convolution layers and one or more pooling layers. In some aspects, the convolutional neural network may be a fully connected network. Generally, the fingerprint may be an embedding representation, or a latent space representation, of an input user identifier. The classification model generally includes one or more activation functions that use the generated fingerprint in order to generate a score indicative of whether a user identifier is fraudulent or legitimate.

In some aspects, in training the classification model, classification model trainer 114 can generate fingerprints for each user identifier included in the training data set. The fingerprints generated by classification model trainer for the user identifiers in the training data set may be aggregated into a fingerprint data set which may be output to clustering model trainer 116 for use in training a clustering model. The clustering model generally may be various clustering models implemented by neural networks or other types of machine learning models. For example, the clustering model may be a k-means clustering model in which a distance metric is used to identify a location within a multidimensional space associated with each fingerprint in the fingerprint data set, mean-shift clustering, centroid-based clustering, or other clustering models which can be used to organize fingerprints into various clusters associated with legitimate or fraudulent users of a software application.

After training the classification model and clustering model, classification model trainer 114 and clustering model trainer 116 can deploy the respective models to user authentication system 120 for use in a production environment.

User authentication system 120 generally represents a gateway through which users of a software application (e.g., application service 132 executing on application server 130) can register for access to the software application and authenticate the user in order to access the software application. User authentication system 120 may be a computing system which can serve as an authentication gateway, such as server computers, cloud compute instances, or the like. While user authentication system 120 and application server 130 are illustrated as separate systems, it should be recognized by one of skill in the art that authentication system 120 and application server 130 may be co-located. As illustrated, user authentication system 120 includes user identifier classifier 122 and fingerprint cluster identifier 124.

User identifier classifier 122 generally uses a classification model trained by classification model trainer 114 and deployed to user identifier classifier 122 in order to generate a fingerprint for a received user identifier and a predictive score for the received user identifier indicating a likelihood that the received user identifier corresponds to a legitimate or a fraudulent user identifier. A user identifier received by user identifier classifier 122 may be received, for example, as part of a registration process in order to obtain access to a software application, as part of an authentication process for the software application, in a batch of extant user identifiers for the software application, or the like. Generally, the fingerprint generated for a received user identifier may be a latent space representation (or embedding representation) of a user identifier generated by a machine learning model, and the predictive score may be a score generated by applying an activation function (e.g., a softmax function, rectifier function, linear function, etc.) to the generated fingerprint.

In some aspects, the generated score may be a classification score between a defined low value and a defined high value. For example, the classification score may be a score between 0 and 1, with scores greater than a defined point (e.g., 0.5) corresponding to user identifiers that are likely legitimate and scores less than the defined point corresponding to user identifiers that are likely fraudulent. In some aspects, user identifier classifier 122 can use the generated score to determine whether to trigger further investigation of a user identifier. For example, if a score generated for a user identifier indicates that the user identifier is likely to be legitimate, user identifier classifier can bypass identification of a similar fingerprint using fingerprint cluster identifier 124 and generate an indication that the user identifier is legitimate (e.g., associated with a legitimate user of a software application) and thus that the user associated with the user identifier is allowed to access application service 132. In some aspects, however, identification of similar users using fingerprint cluster identifier 124 (as discussed in further detail below) can be used as an additional check to increase confidence in a determination that a user identifier is a legitimate user identifier.

In some aspects, the fingerprints generated for user identifiers input into user identifier classifier 122 may be generated such that user identifiers generated by the same algorithm have similar fingerprints. For example, the fingerprints generated for user identifiers generated using the same identifier generation algorithm may have small cosine distances (or other distances) between each other and may have large cosine distances (or other cosine distances) to fingerprints associated with legitimate user identifiers and fingerprints generated for user identifiers generated using a different identifier generation algorithm.

In some aspects, user identifier classifier 122 can output the user identifier fingerprint to fingerprint cluster identifier 124 in order to identify one or more similar user identifiers (e.g., user identifiers having similar fingerprints to the fingerprint generated by user identifier classifier 122 for the received user identifier). As discussed, because fingerprints associated with user identifiers generated using the same identifier generation algorithm may have small cosine distances to each other and may further away from fingerprints associated with legitimate user identifiers and fingerprints associated with user identifiers generated using different identifier generation algorithms, information about similar user identifiers can be used to confirm a classification of a user identifier as fraudulent or legitimate.

In some aspects, from a set of fingerprints located within a threshold cosine distance from the fingerprint generated by user identifier classifier 122 for the received user identifier, fingerprint cluster identifier 124 can select the fingerprint having the smallest cosine difference from the fingerprint for the received user identifier. Based on an assumption that fingerprints having close cosine differences indicate that user identifiers associated with these fingerprints are generated similarly, fingerprint cluster identifier 124 can retrieve information about the user identifier associated with the selected fingerprint and use the classification of the selected fingerprint, amongst other information, to confirm the classification of the received user identifier generated by user identifier classifier 122.

For example, fingerprint cluster identifier 124 can use information about a similar user identifier (as identified based on distances between the fingerprint for the received user identifier and the fingerprint for the similar user identifier) to determine whether to grant the user associated with the received user identifier access to application service 132, provisionally grant (or deny) access to application service 132 pending further review, or deny access to application service 132. If the generated score indicates a high likelihood that the user identifier is legitimate and fingerprint cluster identifier 124 identifies a similar user identifier that has also been determined to be legitimate, fingerprint cluster identifier 124 can determine that the received user identifier is legitimate and grant the user access to application service 132.

If, in another example, the generated score is around a defined midpoint (e.g., within a threshold distance of the defined midpoint or otherwise within a defined range), indicating some degree of uncertainty about whether the user identifier is legitimate or fraudulent, fingerprint cluster identifier 124 can use information about a similar user identifier (e.g., a user identifier having a fingerprint that has the smallest cosine distance from the fingerprint generated by user identifier classifier 122 for the received user identifier) to determine whether to grant or deny access to application service 132. In some aspects, the classification assigned to the similar user identifier may also be assigned to the received user identifier, such that the received user identifier is determined to be fraudulent if the similar user identifier has previously been identified as fraudulent and the received user identifier is determined to be legitimate if the similar user identifier has previously been identified as legitimate. In some aspects, this classification may be a provisional classification, subject to manual review. An administrator of application service 132 and/or user authentication system 120 may, in some aspects, be notified that the received user identifier has been granted or denied access to application service 132 pending further review. Based on subsequent analysis of the received user identifier, the received user identifier may be tagged as legitimate or fraudulent and allowed or denied access to application service 132.

In yet another example, when the score generated by user identifier classifier 122 for a received user identifier indicates a high likelihood that the user identifier is fraudulent, analysis of a similar user identifier identified by fingerprint cluster identifier 124 may be used to confirm whether the received user identifier is, in fact, fraudulent. If the similar user identifier has also been determined to be fraudulent, the received user identifier can also be tagged as a fraudulent user identifier, and the user associated with the received user identifier can be blocked from accessing application service 132. If, however, the similar user identifier has been determined to be a legitimate user identifier, fingerprint cluster identifier 124 can take various actions to correct or confirm the classification generated for the received user identifier. In one example, fingerprint cluster identifier 124 can override the classification generated by user identifier classifier 122 and grant the user access to application service 132. In some aspects, the decision to allow the user to access application service 132 may be a provisional decision subject to further correction by an administrator of application service 132 and/or user authentication system 120. In another example, fingerprint cluster identifier 124 can provisionally block the user associated with the received user identifier from accessing application service 132, pending further review by an administrator of application service 132 and/or user authentication system 120.

Application server 130 is generally representative of any computing system which can host an application accessed by external client devices and can perform various computing tasks, such as data storage or other processing tasks (e.g., training of machine learning models, inference using machine learning models, compute-intensive data analysis operations, etc.). These computing systems can include server computers, cloud compute instances, or the like. As illustrated, application server 130 hosts an application service 132.

Application service 132 generally uses information generated by user authentication system 120 to determine whether to communicate with registered users of application service 132 and/or allow registered users of application service 132 to access application service 132. In some aspects, allow/block lists may be maintained at application service 132 based on determinations generated by user authentication system 120 of whether a user identifier is legitimate or fraudulent. Generally, legitimate user identifiers may be placed on the allow list, while fraudulent user identifiers may be placed on the block list. Application service 132 can use the allow list, for example, as a distribution list to send communications relating to application service 132 (e.g., to send updates about the application service 132, coupons or discount codes for use of application service 132, etc.). Meanwhile, application service 132 can use the block list to prevent users associated with user identifiers on the block list from using application service 132 so as to prevent these users from performing malicious activity within or using application service 132 (e.g., sending phishing messages, malware, etc. using the application service 132).

In some aspects, fingerprint cluster identifier 124 and/or application service 132 can generate explanations for why a user identifier was identified as a legitimate or fraudulent user identifier. For example, when the received user identifier is blocked (e.g., based on a determination that the received user identifier is a fraudulent user identifier), fingerprint cluster identifier 124 and/or application service 132 can generate a message for the user associated with the received user identifier indicating that the received user identifier was deemed to be fraudulent. This message may also include information indicating that a similar user identifier was also deemed to be fraudulent.

In certain aspects, user feedback may be received with respect to the outputs from the models, such as indicating that a user identifier is legitimate or fraudulent. For example, an expert or other user may review determinations made using systems described herein in order to determine whether user identifiers have been correctly classified as legitimate or fraudulent, and may provide feedback accordingly. The user feedback may be used to re-train the models described herein for improved accuracy. For example, the user feedback may be used to generate new training data, which may be used by classification model trainer 114 to re-train user identifier classifier 122, and may also be used by clustering model trainer 116 to re-train fingerprint cluster identifier 124 (e.g., based on updated fingerprints determined using the re-trained user identifier classifier 122). Thus, the models described herein may be continuously improved in a feedback loop.

In certain aspects, the classification of a user identifier as a fraudulent user identifier or a legitimate user identifier using the techniques discussed herein may allow for user authentication system 120 to identify new fraudulent users by adding a fingerprint of a user identifier classified by the classification model as a fraudulent user identifier to a blocklist of fingerprints. Similarly, user authentication system 120 may identify new legitimate users by adding a fingerprint of a user classified by the classification model as a legitimate user identifier to an allow list of fingerprints. In doing so, aspects of the present disclosure may classify user identifiers without retraining the classification model or the clustering model described herein. Retraining of the classification model and the clustering model may be performed in some cases, however, to account for changes in patterns of user identifiers, the introduction of new generative algorithms for generating user identifiers, or the like.

Example Classification Neural Network

Figure 2:
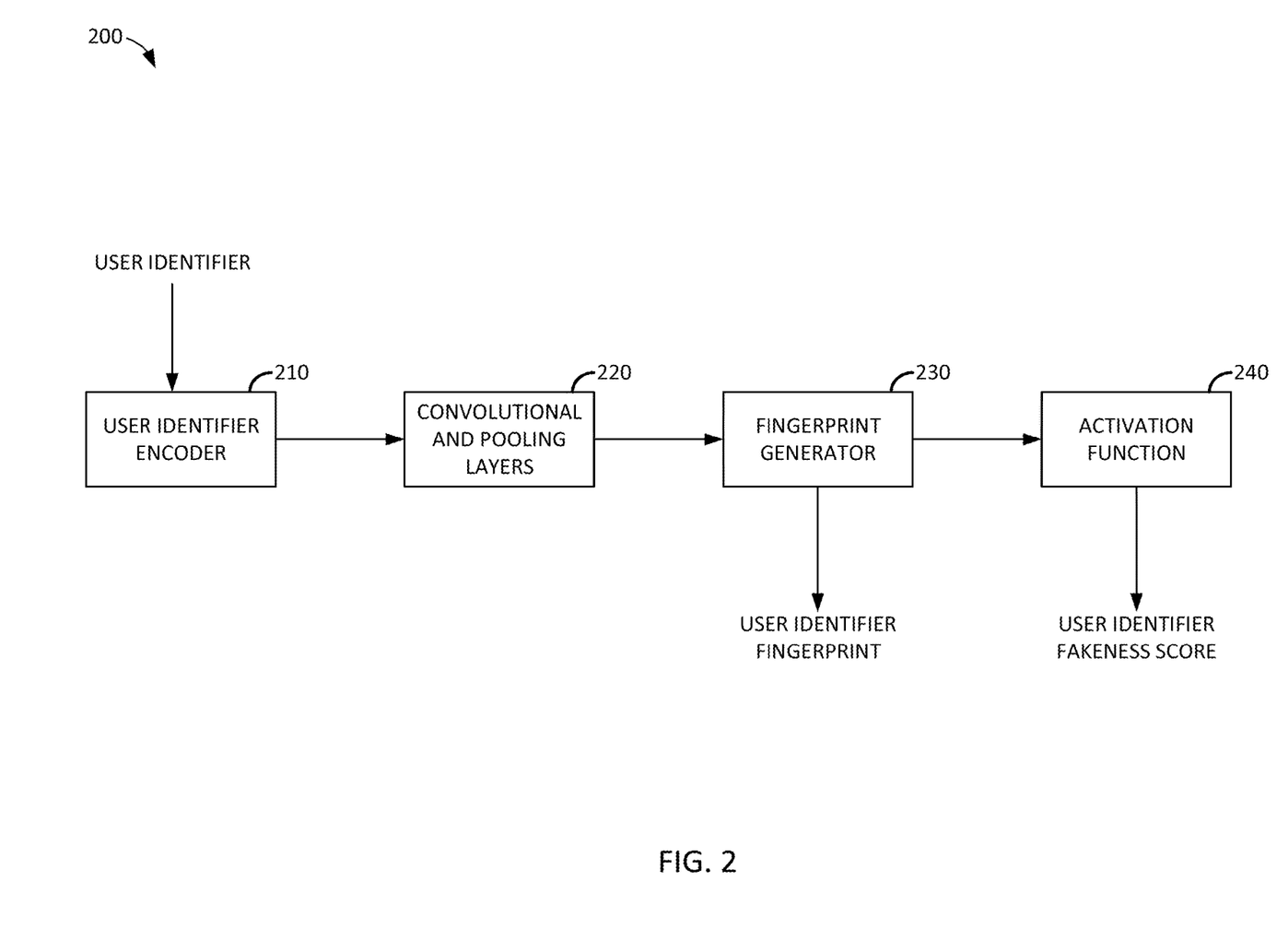
FIG. 2 illustrates an example machine learning model trained to generate fingerprints and a predictive score for a user identifier, in accordance with aspects of the present disclosure.

FIG. 2 illustrates an example neural network 200 trained to generate fingerprints and a predictive score for a user identifier, in accordance with aspects of the present disclosure. As illustrated, neural network 200 includes a user identifier encoder 210, one or more convolutional and/or pooling layers 220, a fingerprint generator 230, and an activation function 240.

Generally, user identifier encoder 210 encodes a received user identifier into a vector representation of the user identifier which can be used as input into the convolutional layers of the neural network. As described above, the vector representation of the user identifier may be a two-dimensional matrix including a one-hot vector for each character in the user identifier. For each character of the user identifier, the one-hot vector for that character may include one value set to high, corresponding to the matching character, and the remaining values in the one-hot vector may be set to a low value. In some aspects, user identifier encoder 210 may further process the vector representation of the user identifier to map the vector representation of the user identifier to one or more values in a defined space. For example, user identifier encoder 210 can map the user identifier to one or more values in a space defined as a 64×64 matrix or a matrix of some other dimensionality.

The encoded user identifier generated by user identifier encoder 210 can then be fed into convolutional and pooling layers 220. Convolutional and pooling layers 220 may include a series of one-dimensional convolutional and pooling layers that generates an output having a reduced size relative to the encoded user identifier. For example, convolutional and pooling layers 220 can generate a two-dimensional floating matrix that is smaller in size than the encoded user identifier.

The output generated by convolutional and pooling layers 220 may be fed into fingerprint generator 230 in order to generate the fingerprint for the user identifier. In some aspects, fingerprint generator 230 may collapse the two-dimensional output generated by convolutional and pooling layers 220 into a one-dimensional representation and feed this one-dimensional representation into a fully connected layer that generates the fingerprint for the user identifier. In some aspects, the fingerprint may be a floating vector with a defined length, such as a vector with a length of 250. Generally, fingerprint generator 230 can generate fingerprints for user identifiers such that user identifiers having similar patterns have similar fingerprints. That is, fingerprints for user identifiers generated using a first generative algorithm may be similar (e.g., have small cosine distances between each other) and may be different (e.g., have large cosine distances between each other) from fingerprints for user identifiers generated using a second generative algorithm.

Activation function 240 may be a classification layer that generates a fakeness score between a defined low value and a defined high value for the user identifier based on the fingerprint generated by fingerprint generator 230. In some aspects, activation function 240 may be a softmax function or other function configured to convert a vector to a numerical score. In some aspects, the defined low value for the fakeness score may correspond to a user identifier being a legitimate user identifier that was manually generated, and the defined high value may correspond to the user identifier being a fraudulent user identifier generated using a generative algorithm.

Figure 3:
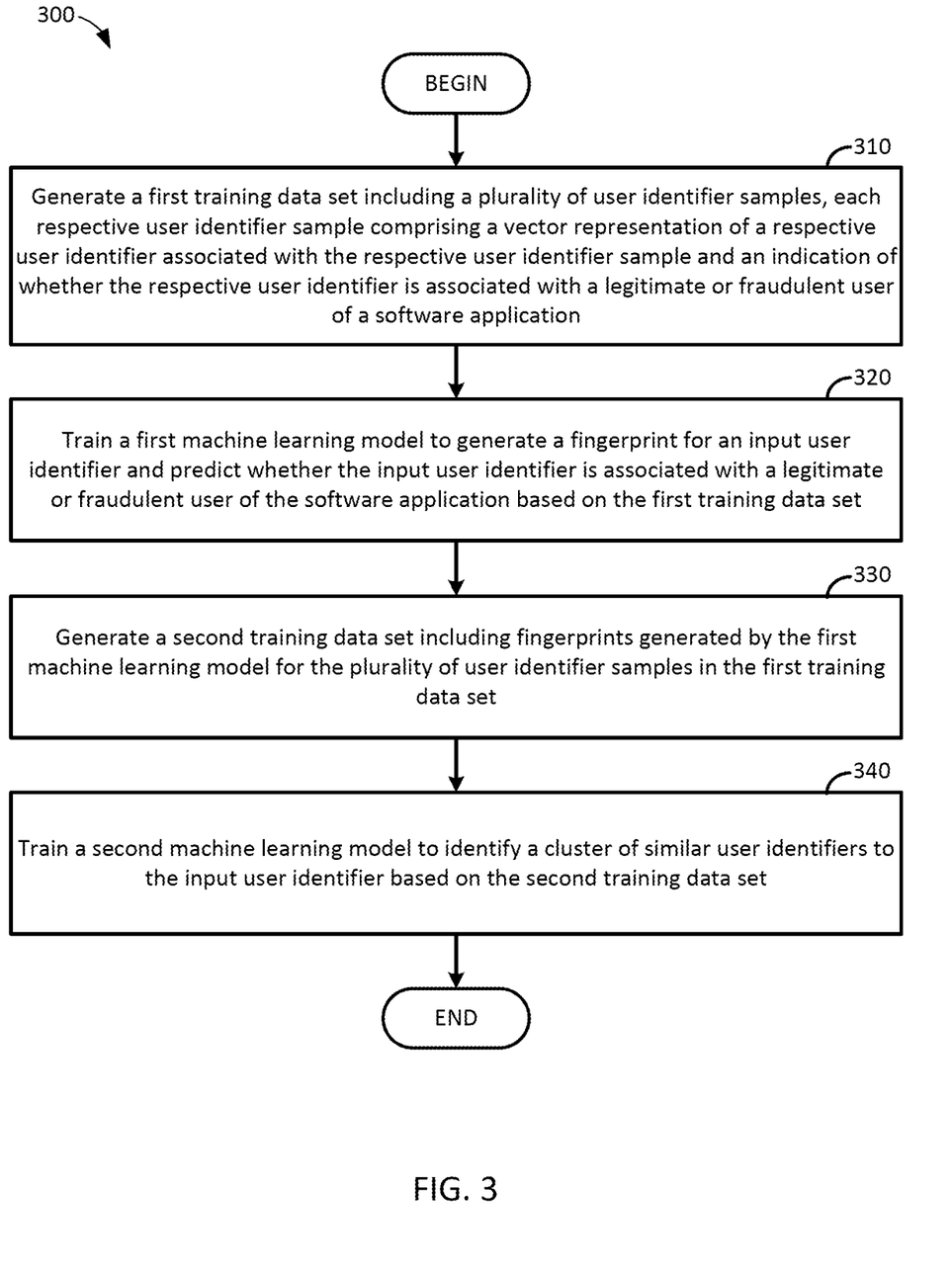
FIG. 3 illustrates example operations that may be performed by a computing system to train a first machine learning model to classify user identifiers as fraudulent or legitimate and a second machine learning model to identify similar user identifiers to an input user identifier, in accordance with aspects of the present disclosure.

Example Computer-Implemented Method for Identifying Fraudulent User Identifiers Using Machine Learning Models FIG. 3 illustrates example operations 300 for training a machine learning model to classify a user identifier as fraudulent or legitimate, in accordance with aspects of the present disclosure. Operations 300 may be performed by a model training system, such as model training system 110 illustrated in FIG. 1.

As illustrated, operations 300 begin at block 310, with generating a first training data set including a plurality of user identifier samples. Generally, each respective user identifier sample of the plurality of user identifier samples includes a vector representation of a respective user identifier associated with the respective user identifier sample and an indication of whether the respective user identifier is associated with a legitimate or fraudulent user of a software application. Generally, the training data set may include samples of user identifiers that have been previously identified as fraudulent or legitimate. The training data set may, in some aspects, include a balanced set of legitimate user identifiers and fraudulent user identifiers, and the fraudulent user identifiers included in the training data set may include batches of user identifiers generated using different generative algorithms.

In some aspects, to generate a vector representation of the respective user identifier, a two-dimensional matrix can be generated. The two dimensional matrix generally includes a one-hot vector representing each character in the user identifier. In some aspects, the one-hot vector may be a one-dimensional matrix including an entry for each valid character which can be included in a user identifier. One entry in the one-dimensional matrix may be set to a high value, corresponding to a specific character at a specific location in a string representation of the respective user identifier, and the remaining entries in the one-dimensional matrix may be set to a low value.

At block 320, operations 300 proceed with training a first machine learning model to generate a fingerprint for an input user identifier and predict whether the input user identifier is associated with a legitimate or fraudulent user of the software application based on the first training data set. In some aspects, the first machine learning model may be a classifier neural network trained to classify the generated fingerprint as fraudulent or legitimate. The classifier neural network may include one or more convolutional layers, one or more pooling layers, a fully-connected layer configured to generate a fingerprint for the input user identifier, and an activation function that generates a predictive score based on the generated fingerprint. In some aspects, training the first machine learning model involves a supervised learning process where parameters of the first machine learning model are iteratively updated based on comparing outputs from the first machine learning model in response to training inputs (e.g., the vector representations of respective user identifiers from step 310) with known labels associated with the training inputs (e.g., the indications from step 310 of whether respective user identifiers are associated with a legitimate or fraudulent user of a software application).

At block 330, operations 300 proceed with generating a second training data set including fingerprints generated by the first machine learning model for the plurality of user identifier samples in the first training data set.

At block 340, operations 300 proceed with training a second machine learning model to identify a cluster of similar user identifiers to the input user identifier based on the second training data set. In some aspects, training the second machine learning model involves one or more clustering algorithms, such as k-means.

In some aspects, operations 300 include deploying the first machine learning model and the second machine learning model.

Figure 4:
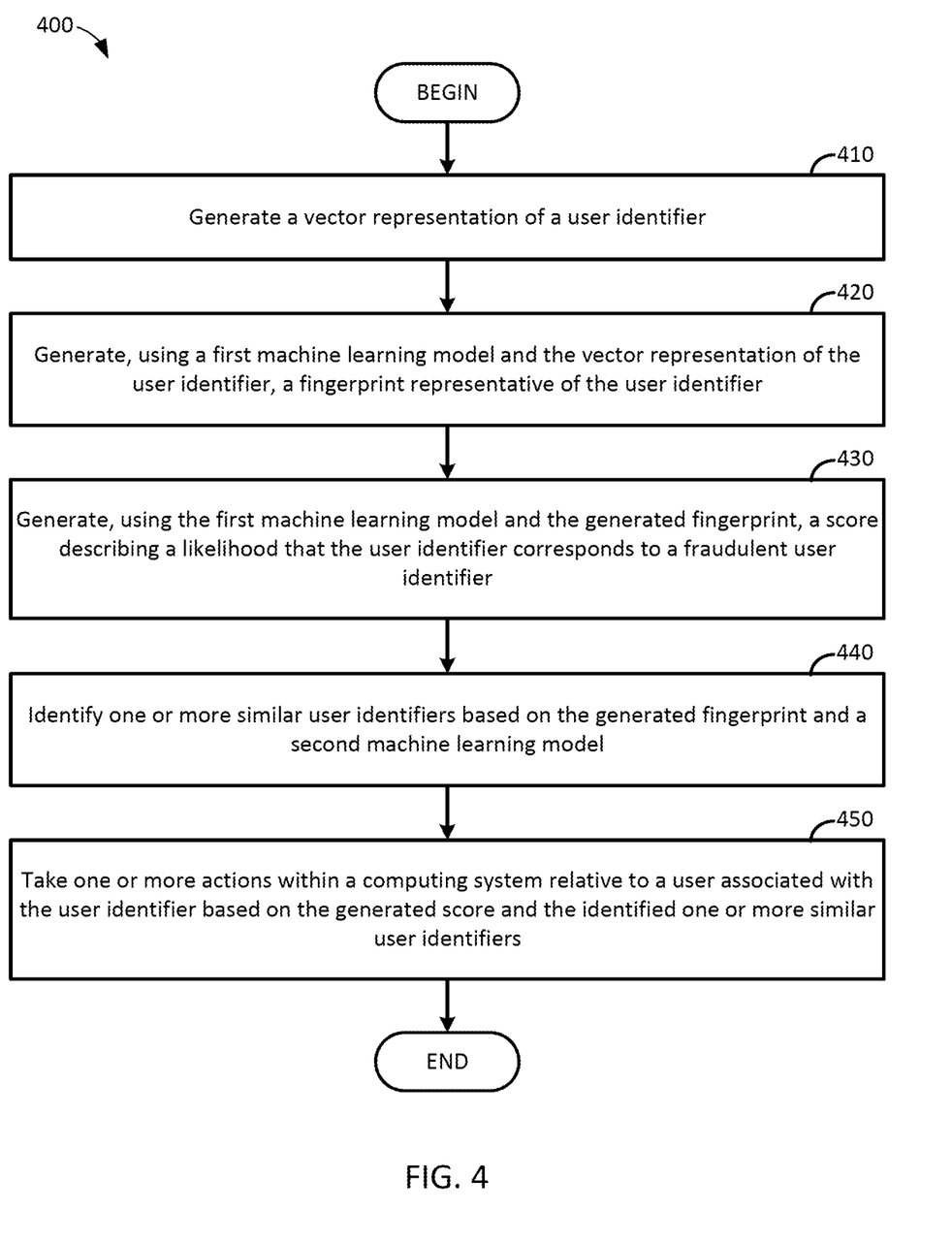
FIG. 4 illustrates example operations that may be performed by a computing system to identify potentially fraudulent user identifiers in a software application, in accordance with aspects of the present disclosure.

FIG. 4 illustrates example operations 400 for predicting whether a user identifier is a fraudulent user identifier or a legitimate user identifier, in accordance with aspects of the present disclosure. Operations 400 may be performed, for example, by a user identifier classifier and a fingerprint cluster identifier hosted on a user authentication system that controls access to a software application (e.g., user identifier classifier 122 and fingerprint cluster identifier 124 of user authentication system 120, illustrated in FIG. 1).

As illustrated, operations 400 begin at block 410, with generating a vector representation of a user identifier.

In some aspects, to generate a vector representation of the user identifier, a two-dimensional matrix can be generated. The two dimensional matrix generally includes a one-hot vector representing each character in the user identifier. In some aspects, the one-hot vector may be a one-dimensional matrix including an entry for each valid character which can be included in a user identifier. One entry in the one-dimensional matrix may be set to a high value, corresponding to a specific character at a specific location in a string representation of the respective user identifier, and the remaining entries in the one-dimensional matrix may be set to a low value.

At block 420, operations 400 proceed with generating, using a first machine learning model and the vector representation of the user identifier, a fingerprint representative of the user identifier.

At block 430, operations 400 proceed with generating, using the first machine learning model and the generated fingerprint, a score describing a likelihood that the user identifier corresponds to a fraudulent user identifier.

In some aspects, the first machine learning model may be a classifier neural network trained to classify the generated fingerprint as fraudulent or legitimate. The classifier neural network may include one or more convolutional layers, one or more pooling layers, a fully-connected layer configured to generate a fingerprint for the user identifier, and an activation function that generates a predictive score based on the generated fingerprint. The classifier neural network may output both the generated fingerprint for the user identifier and the predictive score generated for the user identifier. As discussed, the fingerprint and the score generated by the first machine learning model can be used, alone or in conjunction with each other, to determine whether a user identifier is legitimate or fraudulent and to allow or block a user associated with the user identifier from accessing or otherwise interacting with a software application (e.g., application service 132 executing on application server 130, as illustrated in FIG. 1).

At block 440, operations 400 proceed with identifying one or more similar user identifiers based on the generated fingerprint and a second machine learning model.

In some aspects, the second machine learning model may be a clustering machine learning model.

In some aspects, identifying the one or more similar user identifiers comprises identifying user identifiers having fingerprints a threshold distance away from the generated fingerprint.

At block 450, operations 400 proceed with taking one or more actions within a computing system relative to a user associated with the user identifier based on the generated score and the identified one or more similar user identifiers.

In some aspects, operations 400 include receiving the user identifier during a registration process in a software application hosted on the computing system. The taking the one or more actions may include blocking registration of the user within the software application when the generated score indicates that the user identifier is a fraudulent user identifier and when a distance between the generated fingerprint and a closest user identifier of the identified one or more similar user identifiers is less than a threshold distance.

In some aspects, operations 400 include receiving the user identifier during an authentication process in a software application hosted on the computing system. For example, the user identifier may be a user identifier generated prior to deployment of the first machine learning model and the second machine learning model. The taking one or more actions may include blocking the user from accessing the software application when the generated score indicates that the user identifier is a fraudulent user identifier and when a distance between the generated fingerprint and a closest user identifier of the identified one or more similar user identifiers is less than a threshold distance.

In some aspects, operations 400 include determining that the generated score indicates that the user identifier is a fraudulent identifier and that a minimal distance between the generated fingerprint and a fingerprint associated with one of the one or more similar user identifiers is below a threshold distance. Taking the one or more actions may include blocking the user from accessing the computing system based on the determining.

In some aspects, operations 400 include determining that the generated score indicates that the user identifier is a fraudulent identifier and that a minimal distance between the generated fingerprint and a fingerprint associated with one of the one or more similar user identifiers is above a threshold distance. Taking the one or more actions generally includes outputting the user identifier to an administrator of the computing system based on the determining.

In some aspects, taking the one or more actions includes adding the user identifier to one of an allow list or a block list based on the generated score and the identified one or more similar user identifiers. Communications may be sent to users having user identifiers on the allow list, but may not be set to users having user identifiers on the block list. Further, users having user identifiers on the block list may be blocked from accessing the software application.

Figure 5:
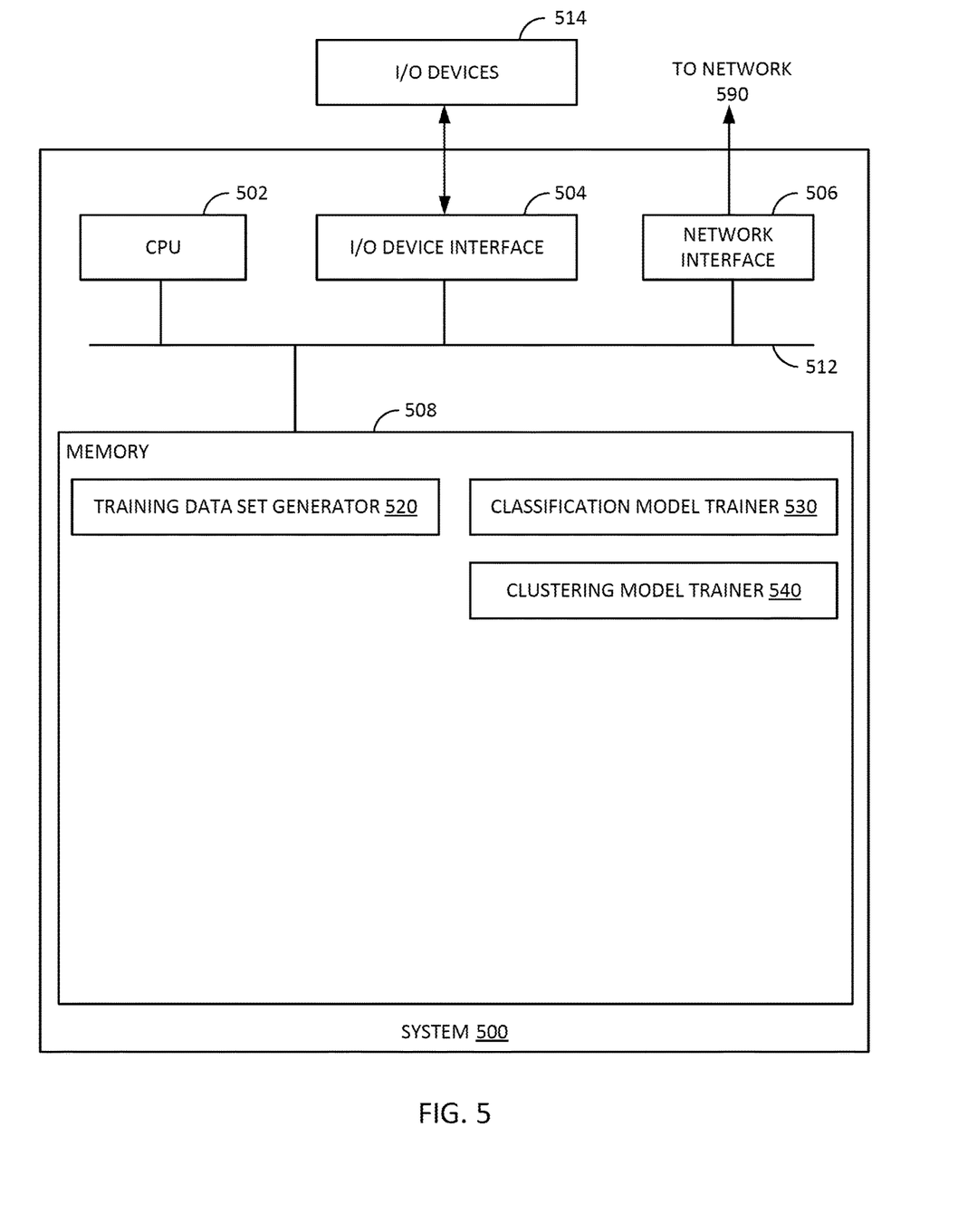
FIG. 5 illustrates a computing system on which aspects of the present disclosure may be performed.

Example Systems for Identifying Fraudulent User Identifiers Using Machine Learning Models FIG. 5 illustrates an example system 500 that trains machine learning models to identify fraudulent user identifiers. In one example, system 500 may correspond to model training system 110 illustrated in FIG. 1 or other computing devices which can train machine learning models to predict whether a user identifier is a fraudulent or legitimate user identifier.

As shown, system 500 includes a central processing unit (CPU) 502, one or more I/O device interfaces 504 that may allow for the connection of various I/O devices 514 (e.g., keyboards, displays, mouse devices, pen input, etc.) to the system 500, network interface 506 through which system 500 is connected to network 590 (which may be a local network, an intranet, the internet, or any other group of computing devices communicatively connected to each other), a memory 508, and an interconnect 512.

CPU 502 may retrieve and execute programming instructions stored in the memory 508. Similarly, the CPU 502 may retrieve and store application data residing in the memory 508. The interconnect 512 transmits programming instructions and application data, among the CPU 502, I/O device interface 504, network interface 506, and memory 508.

CPU 502 is included to be representative of a single CPU, multiple CPUs, a single CPU having multiple processing cores, and the like.

Memory 508 is representative of a volatile memory, such as a random access memory, or a nonvolatile memory, such as nonvolatile random access memory, phase change random access memory, or the like. As shown, memory 508 includes a training data set generator 520, a classification model trainer 530, and a clustering model trainer 540.

Training data set generator 520 generally corresponds to training data set generator 112 illustrated in FIG. 1. Generally, training data set generator 520 generates a training data set including a plurality of samples from historical user identifiers previously registered for use in accessing a software application. Each sample in the training data set generally includes a vector representation of a user identifier and a label indicating whether the user identifier is a fraudulent user identifier or a legitimate user identifier. Generally, the vector representation of the user identifier may be a two-dimensional matrix including a plurality of one-hot vectors, with each character in the user identifier being represented by one of the plurality of one-hot vectors.

Classification model trainer 530 generally corresponds to classification model trainer 114 illustrated in FIG. 1. Generally, classification model trainer 530 uses the training data set generated by training data set generator 520 to train a classification machine learning model to predict whether a user identifier is a fraudulent user identifier or a legitimate user identifier. The classification machine learning model generally includes one or more layers that can output a fingerprint, corresponding to a latent space representation of the user identifier, and a predictive score indicating a likelihood of the user identifier being a fraudulently generated user identifier.

Clustering model trainer 540 generally corresponds to clustering model trainer 116 illustrated in FIG. 1. Generally, clustering model trainer 540 uses the user identifier fingerprints generated by the classification model trained by classification model trainer to train a clustering model that maps user identifier fingerprints to locations in a multidimensional space.

Figure 6:
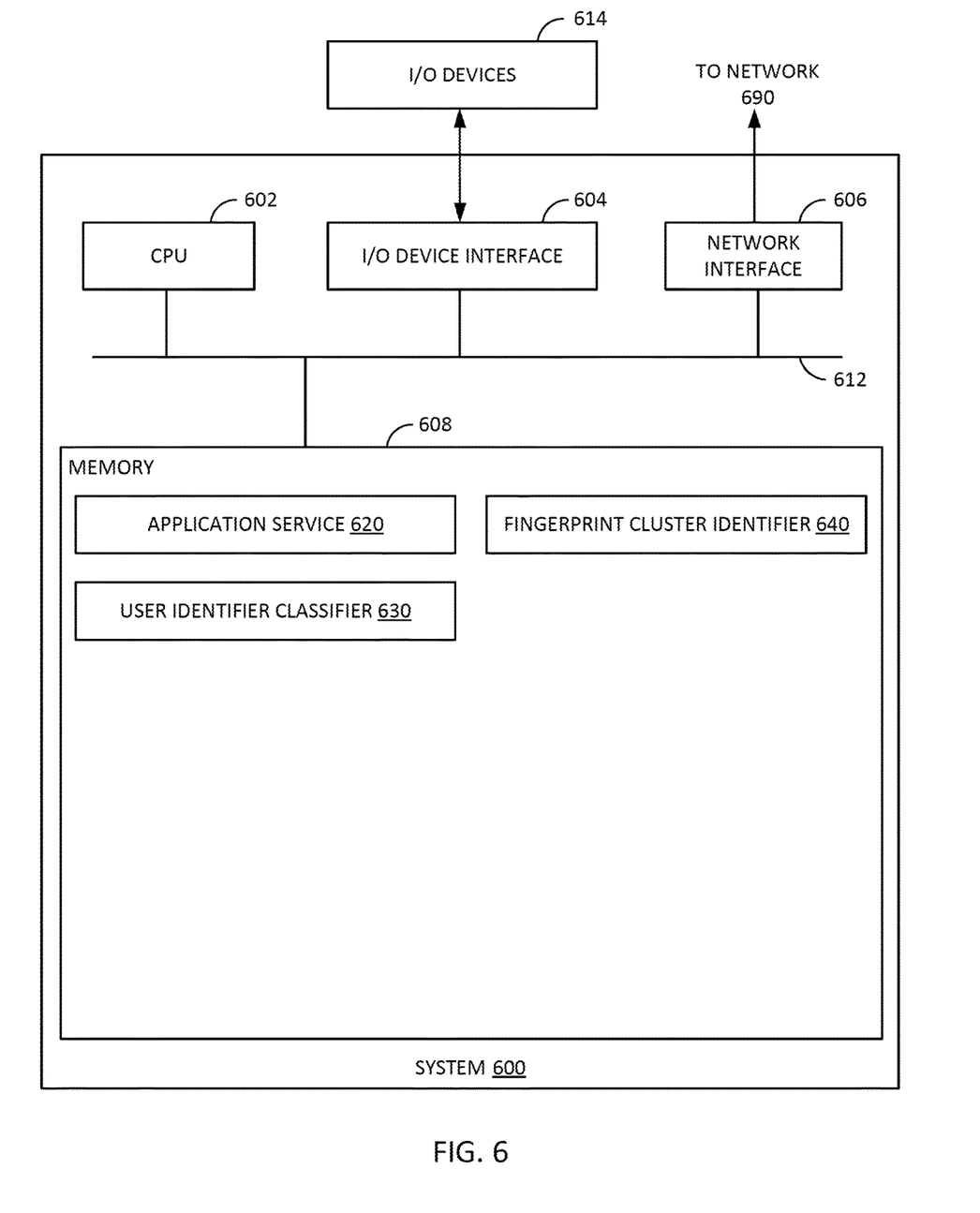
FIG. 6 illustrates a computing system on which aspects of the present disclosure may be performed.

FIG. 6 illustrates an example system 600 that uses machine learning models to identify fraudulent user identifiers and take various actions to block users associated with fraudulent user identifiers from accessing a software application. In one example, system 600 may correspond to user authentication system 120 and application server 130 illustrated in FIG. 1 or other computing devices which can use machine learning models to predict whether a user identifier is a fraudulent or legitimate user identifier and take actions to block users associated with fraudulent user identifiers from accessing a software application.

As shown, system 600 includes a central processing unit (CPU) 602, one or more I/O device interfaces 604 that may allow for the connection of various I/O devices 614 (e.g., keyboards, displays, mouse devices, pen input, etc.) to the system 600, network interface 606 through which system 600 is connected to network 690 (which may be a local network, an intranet, the internet, or any other group of computing devices communicatively connected to each other), a memory 608, and an interconnect 612.

CPU 602 may retrieve and execute programming instructions stored in the memory 608. Similarly, the CPU 602 may retrieve and store application data residing in the memory 608. The interconnect 612 transmits programming instructions and application data, among the CPU 602, I/O device interface 604, network interface 606, and memory 608.

CPU 602 is included to be representative of a single CPU, multiple CPUs, a single CPU having multiple processing cores, and the like.

Memory 608 is representative of a volatile memory, such as a random access memory, or a nonvolatile memory, such as nonvolatile random access memory, phase change random access memory, or the like. As shown, memory 608 includes an application service 620, user identifier classifier 630, and fingerprint cluster identifier 640.

Application service 620 generally corresponds to application service 132 illustrated in FIG. 1. Application service 620 generally hosts one or more access-controlled services for which users can register and authenticate in order to access these services. Generally, application service 620 uses information generated by user identifier classifier 630 and fingerprint cluster identifier 640 to determine whether to allow or block users with specified user identifiers from accessing or otherwise interacting with application service 620. In some aspects, application service 620 can use information identifying legitimate and fraudulent user identifiers to control communications to users of application service 620 (e.g., to direct communications about application service 620 to users associated with legitimate user identifiers and omit sending any communications to users associated with fraudulent user identifiers).

User identifier classifier 630 generally corresponds to user identifier classifier 122 illustrated in FIG. 1. Generally, user identifier classifier 630 uses a trained classifier model to generate a fingerprint representing a user identifier and a score indicating whether the user identifier is fraudulent or legitimate. The fingerprint may be output to fingerprint cluster identifier 640 for further analysis, and the score may be output alone or in combination with the fingerprint to application service 620, which, as discussed, can determine whether a user should be allowed or denied access to the software application.

Fingerprint cluster identifier 640 generally corresponds to fingerprint cluster identifier 124 illustrated in FIG. 1. Generally, fingerprint cluster identifier 640 identifies one or more similar fingerprints to a fingerprint generated for a received user identifier and uses information about the user identifiers associated with the one or more similar fingerprints to aid in determining whether the received user identifier is legitimate or fraudulent. Based on the score, the generated fingerprint, and a classification assigned to user identifiers associated with the one or more similar fingerprints, fingerprint cluster identifier 640 can output information identifying the received user identifier as likely to be legitimate or fraudulent, which can, in some aspects, be used as a signal to allow or block the user associated with the received user identifier from accessing or otherwise interacting with application service 620.

Example Clauses

Implementation details of various aspects of the present disclosure are described in the following numbered clauses.

Clause 1: A method, comprising: generating a vector representation of a user identifier; generating, using a first machine learning model and the vector representation of the user identifier, a fingerprint representative of the user identifier; generating, using the first machine learning model and the generated fingerprint, a score describing a likelihood that the user identifier corresponds to a fraudulent user identifier; identifying one or more similar user identifiers based on the generated fingerprint and a second machine learning model; and taking one or more actions within a computing system relative to a user associated with the user identifier based on the generated score and the identified one or more similar user identifiers.

Clause 2: The method of Clause 1, wherein generating the vector representation of the user identifier comprises generating a two-dimensional matrix including a one-hot representation of each character in the user identifier.

Clause 3: The method of any one of Clauses 1 or 2, further comprising: receiving the user identifier during a registration process in a software application hosted on the computing system, wherein the taking one or more actions comprises blocking registration of the user within the software application when the generated score indicates that the user identifier is a fraudulent user identifier and when a distance between the generated fingerprint and a closest user identifier of the identified one or more similar user identifiers is less than a threshold distance.

Clause 4: The method of any one of Clauses 1 through 3, further comprising: receiving the user identifier during an authentication process in a software application hosted on the computing system, wherein the taking one or more actions comprises blocking the user from accessing the software application when the generated score indicates that the user identifier is a fraudulent user identifier and when a distance between the generated fingerprint and a closest user identifier of the identified one or more similar user identifiers is less than a threshold distance.

Clause 5: The method of any one of Clauses 1 through 4, wherein the first machine learning model comprises a classifier neural network trained to classify the generated fingerprint as fraudulent or legitimate.

Clause 6: The method of any one of Clauses 1 through 5, wherein the second machine learning model comprises a clustering machine learning model.

Clause 7: The method of any one of Clauses 1 through 6, wherein identifying the one or more similar user identifiers comprises identifying user identifiers having fingerprints a threshold distance away from the generated fingerprint.

Clause 8: The method of any one of Clauses 1 through 7, further comprising: determining that the generated score indicates that the user identifier is a fraudulent identifier and that a minimal distance between the generated fingerprint and a fingerprint associated with one of the one or more similar user identifiers is below a threshold distance, wherein taking the one or more actions comprises blocking the user from accessing the computing system based on the determining.

Clause 9: The method of any one of Clauses 1 through 8, further comprising: determining that the generated score indicates that the user identifier is a fraudulent identifier and that a minimal distance between the generated fingerprint and a fingerprint associated with one of the one or more similar user identifiers is above a threshold distance, wherein taking the one or more actions comprises outputting the user identifier to an administrator of the computing system based on the determining.

Clause 10: A method, comprising: generating a first training data set including a plurality of user identifier samples, each respective user identifier sample comprising a vector representation of a respective user identifier associated with the respective user identifier sample and an indication of whether the respective user identifier is associated with a legitimate or fraudulent user of a software application; training a first machine learning model to generate a fingerprint for an input user identifier and predict whether the input user identifier is associated with a legitimate or fraudulent user of the software application based on the first training data set; generating a second training data set including fingerprints generated by the first machine learning model for the plurality of user identifier samples in the first training data set; and training a second machine learning model to identify a cluster of similar user identifiers to the input user identifier based on the second training data set.

Clause 11: The method of Clause 10, wherein the vector representation of the respective user identifier associated with the respective user identifier sample comprises a two-dimensional matrix including a one-hot representation of each character in the user identifier.

Clause 12: The method of any one of Clauses 10 or 11, wherein the first machine learning model comprises a classifier neural network as fraudulent or legitimate.

Clause 13: The method of any one of Clauses 10 through 12, wherein the second machine learning model comprises a clustering machine learning model.

Clause 14: The method of any one of Clauses 10 through 13, further comprising deploying the first machine learning model and the second machine learning model.

Clause 15: An apparatus comprising: a memory having executable instructions stored thereon; and a processor configured to execute the executable instructions to cause the apparatus to perform the operations of any one of Clauses 1 through 14.

Clause 16: An apparatus comprising: means for performing the operations of any one of Clauses 1 through 14.

Clause 17: A computer-readable medium having instructions stored thereon which, when executed by a processor, performs the operations of any one of Clauses 1 through 14.

Additional Considerations

The preceding description is provided to enable any person skilled in the art to practice the various embodiments described herein. Various modifications to these embodiments will be readily apparent to those skilled in the art, and the generic principles defined herein may be applied to other embodiments. For example, changes may be made in the function and arrangement of elements discussed without departing from the scope of the disclosure. Various examples may omit, substitute, or add various procedures or components as appropriate. Also, features described with respect to some examples may be combined in some other examples. For example, an apparatus may be implemented or a method may be practiced using any number of the aspects set forth herein. In addition, the scope of the disclosure is intended to cover such an apparatus or method that is practiced using other structure, functionality, or structure and functionality in addition to, or other than, the various aspects of the disclosure set forth herein. It should be understood that any aspect of the disclosure disclosed herein may be embodied by one or more elements of a claim.

As used herein, a phrase referring to "at least one of" a list of items refers to any combination of those items, including single members. As an example, "at least one of: a, b, or c" is intended to cover a, b, c, a-b, a-c, b-c, and a-b-c, as well as any combination with multiples of the same element (e.g., a-a, a-a-a, a-a-b, a-a-c, a-b-b, a-c-c, b-b, b-b-b, b-b-c, c-c, and c-c-c or any other ordering of a, b, and c).

As used herein, the term "determining" encompasses a wide variety of actions. For example, "determining" may include calculating, computing, processing, deriving, investigating, looking up (e.g., looking up in a table, a database or another data structure), ascertaining and the like. Also, "determining" may include receiving (e.g., receiving information), accessing (e.g., accessing data in a memory) and the like. Also, "determining" may include resolving, selecting, choosing, establishing and the like.

The methods disclosed herein comprise one or more steps or actions for achieving the methods. The method steps and/or actions may be interchanged with one another without departing from the scope of the claims. In other words, unless a specific order of steps or actions is specified, the order and/or use of specific steps and/or actions may be modified without departing from the scope of the claims. Further, the various operations of methods described above may be performed by any suitable means capable of performing the corresponding functions. The means may include various hardware and/or software component(s) and/or module(s), including, but not limited to a circuit, an application specific integrated circuit (ASIC), or processor. Generally, where there are operations illustrated in figures, those operations may have corresponding counterpart means-plus-function components with similar numbering.

The various illustrative logical blocks, modules and circuits described in connection with the present disclosure may be implemented or performed with a general purpose processor, a digital signal processor (DSP), an application specific integrated circuit (ASIC), a field programmable gate array (FPGA) or other programmable logic device (PLD), discrete gate or transistor logic, discrete hardware components, or any combination thereof designed to perform the functions described herein. A general-purpose processor may be a microprocessor, but in the alternative, the processor may be any commercially available processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

A processing system may be implemented with a bus architecture. The bus may include any number of interconnecting buses and bridges depending on the specific application of the processing system and the overall design constraints. The bus may link together various circuits including a processor, machine-readable media, and input/output devices, among others. A user interface (e.g., keypad, display, mouse, joystick, etc.) may also be connected to the bus. The bus may also link various other circuits such as timing sources, peripherals, voltage regulators, power management circuits, and the like, which are well known in the art, and therefore, will not be described any further. The processor may be implemented with one or more general-purpose and/or special-purpose processors. Examples include microprocessors, microcontrollers, DSP processors, and other circuitry that can execute software. Those skilled in the art will recognize how best to implement the described functionality for the processing system depending on the particular application and the overall design constraints imposed on the overall system.

If implemented in software, the functions may be stored or transmitted over as one or more instructions or code on a computer-readable medium. Software shall be construed broadly to mean instructions, data, or any combination thereof, whether referred to as software, firmware, middleware, microcode, hardware description language, or otherwise. Computer-readable media include both computer storage media and communication media, such as any medium that facilitates transfer of a computer program from one place to another. The processor may be responsible for managing the bus and general processing, including the execution of software modules stored on the computer-readable storage media. A computer-readable storage medium may be coupled to a processor such that the processor can read information from, and write information to, the storage medium. In the alternative, the storage medium may be integral to the processor. By way of example, the computer-readable media may include a transmission line, a carrier wave modulated by data, and/or a computer readable storage medium with instructions stored thereon separate from the wireless node, all of which may be accessed by the processor through the bus interface. Alternatively, or in addition, the computer-readable media, or any portion thereof, may be integrated into the processor, such as the case may be with cache and/or general register files. Examples of machine-readable storage media may include, by way of example, RAM (Random Access Memory), flash memory, ROM (Read Only Memory), PROM (Programmable Read-Only Memory), EPROM (Erasable Programmable Read-Only Memory), EEPROM (Electrically Erasable Programmable Read-Only Memory), registers, magnetic disks, optical disks, hard drives, or any other suitable storage medium, or any combination thereof. The machine-readable media may be embodied in a computer-program product.

A software module may comprise a single instruction, or many instructions, and may be distributed over several different code segments, among different programs, and across multiple storage media. The computer-readable media may comprise a number of software modules. The software modules include instructions that, when executed by an apparatus such as a processor, cause the processing system to perform various functions. The software modules may include a transmission module and a receiving module. Each software module may reside in a single storage device or be distributed across multiple storage devices. By way of example, a software module may be loaded into RAM from a hard drive when a triggering event occurs. During execution of the software module, the processor may load some of the instructions into cache to increase access speed. One or more cache lines may then be loaded into a general register file for execution by the processor. When referring to the functionality of a software module, it will be understood that such functionality is implemented by the processor when executing instructions from that software module.

The following claims are not intended to be limited to the embodiments shown herein, but are to be accorded the full scope consistent with the language of the claims. Within a claim, reference to an element in the singular is not intended to mean "one and only one" unless specifically so stated, but rather "one or more." Unless specifically stated otherwise, the term "some" refers to one or more. No claim element is to be construed under the provisions of 35 U.S.C. § 112(f) unless the element is expressly recited using the phrase "means for" or, in the case of a method claim, the element is recited using the phrase "step for." All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims.

What is claimed is:

1. A method, comprising:
   generating a vector representation of a user identifier, wherein generating the vector representation of the user identifier comprises generating a two-dimensional matrix including a one-hot representation of each character in the user identifier;
   generating, using a first machine learning model and the vector representation of the user identifier, a fingerprint representative of the user identifier, wherein the first machine learning model comprises a classifier neural network trained to classify the generated fingerprint as fraudulent or legitimate;
   generating, using the first machine learning model and the generated fingerprint, a score describing a likelihood that the user identifier corresponds to a fraudulent user identifier;
   identifying one or more similar user identifiers based on the generated fingerprint and a second machine learning model, wherein:
   the second machine learning model comprises a clustering machine learning model, and
   identifying the one or more similar user identifiers comprises identifying user identifiers having fingerprints a threshold distance away from the generated fingerprint; and
   taking one or more actions within a computing system relative to a user associated with the user identifier based on the generated score and the identified one or more similar user identifiers.

2. The method of claim 1, further comprising:
   receiving the user identifier during a registration process in a software application hosted on the computing system,
   wherein the taking one or more actions comprises blocking registration of the user within the software application when the generated score indicates that the user identifier is a fraudulent user identifier and when a distance between the generated fingerprint and a closest user identifier of the identified one or more similar user identifiers is less than a threshold distance.

3. The method of claim 1, further comprising:
   receiving the user identifier during an authentication process in a software application hosted on the computing system,
   wherein the taking one or more actions comprises blocking the user from accessing the software application when the generated score indicates that the user identifier is a fraudulent user identifier and when a distance between the generated fingerprint and a closest user identifier of the identified one or more similar user identifiers is less than a threshold distance.

4. The method of claim 1, further comprising:
   determining that the generated score indicates that the user identifier is a fraudulent identifier and that a minimal distance between the generated fingerprint and a fingerprint associated with one of the one or more similar user identifiers is below a threshold distance,
   wherein taking the one or more actions comprises blocking the user from accessing the computing system based on the determining.

5. The method of claim 1, further comprising:
   determining that the generated score indicates that the user identifier is a fraudulent identifier and that a minimal distance between the generated fingerprint and a fingerprint associated with one of the one or more similar user identifiers is above a threshold distance,
   wherein taking the one or more actions comprises outputting the user identifier to an administrator of the computing system based on the determining.

6. A system, comprising:
a memory having executable instructions stored thereon; and
a processor configured to execute the executable instructions in order to cause the system to:
   generate a vector representation of a user identifier, wherein generating the vector representation of the user identifier comprises generating a two-dimensional matrix including a one-hot representation of each character in the user identifier;
   generate, using a first machine learning model and the vector representation of the user identifier, a fingerprint representative of the user identifier, wherein the first machine learning model comprises a classifier neural network trained to classify the generated fingerprint as fraudulent or legitimate;

generate, using the first machine learning model and the generated fingerprint, a score describing a likelihood that the user identifier corresponds to a fraudulent user identifier;

identify one or more similar user identifiers based on the generated fingerprint and a second machine learning model, wherein:

the second machine learning model comprises a clustering machine learning model, and in order to identify the one or more similar user identifiers, the processor is configured to cause the system to identify user identifiers having fingerprints a threshold distance away from the generated fingerprint; and take one or more actions within a computing system relative to a user associated with the user identifier based on the generated score and the identified one or more similar user identifiers.

7. The system of claim 6, wherein the processor is further configured to cause the system to:

receive the user identifier during a registration process in a software application hosted on the computing system, wherein in order to take the one or more actions, the processor is configured to cause the system to block registration of the user within the software application when the generated score indicates that the user identifier is a fraudulent user identifier and when a distance between the generated fingerprint and a closest user identifier of the identified one or more similar user identifiers is less than a threshold distance.

8. The system of claim 6, wherein the processor is further configured to cause the system to:

receive the user identifier during an authentication process in a software application hosted on the computing system, wherein in order to take the one or more actions, the processor is configured to cause the system to block the user from accessing the software application when the generated score indicates that the user identifier is a fraudulent user identifier and when a distance between the generated fingerprint and a closest user identifier of the identified one or more similar user identifiers is less than a threshold distance.

9. The system of claim 6, wherein the processor is further configured to cause the system to:

determine that the generated score indicates that the user identifier is a fraudulent identifier and that a minimal distance between the generated fingerprint and a fingerprint associated with one of the one or more similar user identifiers is below a threshold distance, wherein in order to take the one or more actions, the processor is configured to cause the system to block the user from accessing the computing system based on the determining.

10. The system of claim 6, wherein the processor is further configured to cause the system to:

determine that the generated score indicates that the user identifier is a fraudulent identifier and that a minimal distance between the generated fingerprint and a fingerprint associated with one of the one or more similar user identifiers is above a threshold distance, wherein in order to take the one or more actions, the processor is configured to cause the system to output the user identifier to an administrator of the computing system based on the determining.

* * * * *